Patented June 3, 1941

2,244,629

UNITED STATES PATENT OFFICE 2,244,629

MANUFACTURE OF METHYL BROMIDE

John E. Livak and Amos T. Knutson, Midland, Mich., assignors to The Dow Chemical Company, Midland, Mich., a corporation of Michigan No Drawing. Application June 30, 1939,
Serial No. 282,082

6 Claims. (Cl. 260—657)

This invention concerns an improved method of manufacturing methyl bromide by the reaction of hydrogen bromide with methyl alcohol.

Norris, in Am. Chem. J. 38 627–642 (1907), has shown that methyl bromide may be formed by slowly distilling a solution of methyl alcohol and aqueous hydrobromic acid and that such procedure avoids the by-product formation which occurs when condensing agents, i. e. dehydrating agents, are employed. However, he also has shown that in such reaction a large excess of hydrobromic acid must be used in order to obtain satisfactory conversion of the alcohol to methyl bromide. Accordingly, it is customary in the manufacture of methyl bromide, to carry the reaction out in the presence of condensing agents, e. g. phosphorus halides, sulphuric acid, etc., so as to obtain more rapid and complete consumption of the methyl alcohol, although such practice, as pointed out by Norris, results in appreciable by-product formation. An object of the present invention is to provide an improved method of making methyl bromide by reaction of either gaseous or aqueous hydrogen bromide with methyl alcohol which permits rapid reaction without employment of condensing agents of the type which give rise to by-product formation.

We have found that the presence of a reducing agent during the reaction of hydrogen bromide with methyl alcohol causes more rapid and complete reaction than is obtained in the absence of such agent under otherwise similar operating conditions. More important, we have found that the mixture of hydrogen and hydrogen bromide formed by reacting bromine with an excess of hydrogen is especially reactive with methyl alcohol. A mixture of hydrogen and hydrogen bromide prepared as just stated is far more reactive with methyl alcohol than is a mixture of hydrogen and hydrogen bromide in the same proportions prepared by adding hydrogen to pure hydrogen bromide, but this latter mixture is somewhat more reactive than hydrogen bromide alone with the alcohol. It is believed that the mixture of hydrogen and hydrogen bromide formed by the reaction of bromine with excess hydrogen contains and retains for an appreciable period of time a small proportion of the hydrogen and/or hydrogen bromide in an unusually reactive form, but the invention is not restricted to this theory. Peculiarly, in tests on the preparation of ethyl bromide from ethyl alcohol and hydrogen bromide, it was found that hydrogen bromide alone was practically as reactive with the ethyl alcohol as was the mixture of hydrogen and hydrogen bromide formed by the reaction of bromine with excess hydrogen.

The reaction of hydrogen bromide with methyl alcohol is preferably carried out in vapor phase, but it may be carried out in liquid phase, e. g. by heating a solution of methyl alcohol in aqueous hydrobromic acid, the only requirements being that a gaseous reducing agent be present during the reaction and that condensing agents such as phosphorus halides, sulphuric acid, etc., be excluded from the zone of reaction. The reaction may be started in the absence of water at a moderately elevated temperature, e. g. 40°–50° C., but is preferably carried out at somewhat higher temperatures, e. g. temperatures of 50°–125° C. The hydrogen bromide, methyl alcohol and the gaseous reducing agent may be used in any desired proportions, but it is usually most convenient and economical, particularly when operating in vapor phase to employ between 1 and 1.2 moles of hydrogen bromide per mole of alcohol and to pass into the reacting mixture sufficient gaseous reducing agent so that the latter is evolved with the methyl bromide product. The reducing agent employed should, of course, be neutral or acidic, since a basic agent would react with the hydrogen bromide. Examples of suitable gaseous reducing agents are hydrogen, sulphur dioxide, hydrogen sulphide, carbon monoxide, etc.

As hereinbefore indicated, the reaction occurs most rapidly when carried out in vapor phase using a mixture of hydrogen and hydrogen bromide, produced by reacting bromine and hydrogen in the presence of an excess of the latter, to supply the reducing agent and hydrogen bromide required. In practice, methyl bromide is preferably prepared as follows. Bromine and a molecular excess of hydrogen are passed into admixture with one another at a temperature such that they react immediately upon mixing. Procedure for carrying out this reaction is known, but we wish to mention that the bromine and hydrogen should be reacted immediately as they flow into contact with one another so as to avoid accumulation of an explosive mixture of the reactants.

The mixture of hydrogen and hydrogen bromide is passed from the hydrogen bromide generator in which it is formed to the lower portion of a still where it is heated to a temperature above 50° C. Methyl alcohol is at the same time fed into the still, preferably by way of the distilling column. The reaction that takes place results in the formation of methyl bromide (which is evolved with the hydrogen) and water, which absorbs hydrogen bromide to form aqueous hydrobromic acid. Preferably between 1 and 1.2 moles of hydrogen bromide per mole of alcohol are fed to the reaction, so that a constant boiling hydrobromic acid solution will be formed and evolution of appreciable hydrogen bromide with the methyl bromide product will be avoided, but the alcohol and hydrogen bromide may be employed in other proportions. The aqueous hydrobromic acid is withdrawn continuously or intermittently from the lower portion of the still so as to prevent its accumulation in excessive quantity, but an inventory of the aqueous acid is preferably maintained at its boiling temperature in the pot or boiler of the still so as to avoid accumulation of unreacted alcohol in the acid liquor. Reaction between the alcohol and hydrobromic acid probably occurs to a slight extent in the boiling acid liquor, although, as already mentioned, it takes place largely and most rapidly in the vapor mixture of hydrogen bromide and alcohol above the liquor. For this reason, the alcohol reactant is preferably introduced near the center or in the upper portion of the distilling column so that it will descend into the zone of greatest reactivity while in concentrated form.

The still is preferably operated so as to reflux the alcohol and aqueous hydrobromic acid. The gaseous mixture of methyl bromide and hydrogen evolved from the reaction mixture is cooled as it leaves the distilling column so as to condense any alcohol therein and the alcohol is returned to the reaction. Methyl bromide is separated from the hydrogen by conventional procedure, e. g. by cooling, preferably under pressure, to liquefy the methyl bromide, or by extracting the latter from the gaseous mixture with a solvent or absorbent. Yields of methyl bromide greater than 90 per cent of theoretical, based on the methyl alcohol employed, and greater than 95 per cent, based on the alcohol consumed, are obtainable by operating as just described.

The following table, which describes the results of four experiments on the preparation of methyl bromide from methyl alcohol and hydrogen bromide, demonstrates certain advantages of the invention. All of the experiments were carried out under similar operating conditions, except that in run 1 of the table hydrogen bromide alone was reacted with methyl alcohol, whereas in each of the runs 2–4 a reducing agent also was present, as required by the invention. The reducing agent employed in run 2 was hydrogen, which was mixed with pure hydrogen bromide prior to introducing the latter to the reaction. The mixture of hydrogen bromide and hydrogen contained 13 per cent of the latter. In run 3, 0.2 per cent by volume of sulphur dioxide was admixed with pure hydrogen bromide prior to introducing the latter to the reaction. In run 4, a mixture of hydrogen bromide and hydrogen, containing about 15 per cent of the latter, was prepared by the combustion of hydrogen with bromine, and was passed directly from the combustion chamber to the reaction with methyl alcohol. The procedure in carrying out each run was to introduce methyl alcohol near the center of a distilling column, heated to a temperature of about 60° C., and hydrogen bromide or a gaseous mixture of hydrogen bromide and the reducing agent into the pot of the still, while at the same time condensing and returning to the still column any methyl alcohol in the methyl bromide vapors evolved. As the reaction progressed, the aqueous hydrobromic acid formed was boiled under reflux in the still. In each run, between 1.1 and 1.2 moles of hydrogen bromide was passed into the reaction mixture per mole of methyl alcohol consumed. The reaction between methyl alcohol and hydrogen bromide appeared to take place largely in the distilling column, although it probably occurred also to some extent in the pot of the still. The methyl bromide evolved was liquefied and collected in a trap cooled with a mixture of acetone and solid carbon dioxide. The table gives the identity of the hydrogen bromide-containing gas fed into each reaction mixture and the yield of methyl bromide, based both upon the total quantity of methyl alcohol employed and upon the alcohol consumed in the reaction.

Table

| Run No. | HBr-containing gas | Percent yield of $CH_3Br$ based on— | |
|---|---|---|---|
| | | $CH_3OH$ employed | $CH_3OH$ consumed |
| 1 | Pure HBr | 73.8 | 88.0 |
| 2 | $H_2$ mixed with HBr | 86.0 | 94.6 |
| 3 | $SO_2$ mixed with HBr | 86.3 | 96.0 |
| 4 | $H_2$ and HBr mixture from reaction of $Br_2$ with excess $H_2$ | 92.9 | 97.2 |

From the above table it will be seen that the presence of a gaseous reducing agent increases materially both the rate of reaction between hydrogen bromide and methyl alcohol and the yield of methyl bromide from the reaction. It will also be seen that these advantages are most pronounced when a mixture of hydrogen and hydrogen bromide produced by the reaction of bromine with excess hydrogen is used in the reaction.

Other modes of applying the principle of the invention may be employed instead of those explained, change being made as regards the method herein disclosed, provided the step or steps stated in any of the following claims or the equivalent of such stated step or steps be employed.

We therefore particularly point out and distinctly claim as our invention:

1. In the preparation of methyl bromide by reacting hydrogen bromide with methyl alcohol in the substantial absence of dehydrating agents, the step of carrying the reaction out in the presence of a gaseous reducing agent.

2. In the preparation of methyl bromide by reacting hydrogen bromide with methyl alcohol in the absence of dehydrating agents, the step of carrying the reaction out in the presence of sulphur dioxide.

3. In the preparation of methyl bromide by reacting hydrogen bromide with methyl alcohol in the absence of dehydrating agents, the step of carrying the reaction out in the presence of hydrogen.

4. In the preparation of methyl bromide by reacting hydrogen bromide with methyl alcohol in the absence of dehydrating agents, the steps of employing as a reactant hydrogen bromide formed by the reaction of bromine with hydrogen in the presence of excess hydrogen and of carrying the reaction between the hydrogen bromide and methyl alcohol out in the presence of the excess hydrogen.

5. In a method for making methyl bromide, the steps of reacting bromine with hydrogen to form a gaseous mixture of hydrogen bromide and hydrogen, and passing this gas mixture into admixture with methyl alcohol while heating the resultant mixture to a reaction temperature above 50° C., whereby methyl bromide is formed and evolved from the mixture.

6. In a method for making methyl bromide, the steps of boiling an aqueous hydrobromic acid solution under reflux while introducing to the solution a freshly formed mixture of hydrogen bromide and hydrogen (which mixture is prepared by the reaction of bromine with hydrogen in the presence of an excess of the latter), simultaneously introducing methyl alcohol into admixture with the vapors above the boiling hydrobromic acid, and collecting the methyl bromide evolved from the reaction mixture.

JOHN E. LIVAK.
AMOS T. KNUTSON.